US006632765B1

(12) United States Patent
Chen

(10) Patent No.: US 6,632,765 B1
(45) Date of Patent: Oct. 14, 2003

(54) CATALYST REGENERATION VIA REDUCTION WITH HYDROGEN

(75) Inventor: Con-Yan Chen, Kensington, CA (US)

(73) Assignee: Chervon U.S.A. Inc., San Ramon, CA (US)

( * ) Notice: Subject to any disclaimer, the term of this patent is extended or adjusted under 35 U.S.C. 154(b) by 12 days.

(21) Appl. No.: 09/602,144

(22) Filed: Jun. 23, 2000

(51) Int. Cl.$^7$ .............................. B01J 38/10; C07C 6/02
(52) U.S. Cl. ........................................ 502/53; 585/646
(58) Field of Search ...................... 502/34, 53; 585/646

(56) References Cited

U.S. PATENT DOCUMENTS

| | | | |
|---|---|---|---|
| 2,758,063 A | | 8/1956 | MacLaren et al. ............ 196/50 |
| 3,590,007 A | | 6/1971 | Schutt ........................ 252/411 |
| 3,856,876 A | * | 12/1974 | Burnett ................... 260/676 R |
| 4,358,395 A | * | 11/1982 | Haag et al. ............. 252/411 R |
| 4,908,341 A | * | 3/1990 | Pruden et al. ................ 502/30 |
| 5,200,375 A | * | 4/1993 | Dessau ........................ 502/53 |
| 5,405,814 A | * | 4/1995 | Beech, Jr. et al. ............ 502/53 |
| 5,558,767 A | * | 9/1996 | Ressl .......................... 208/105 |
| 6,369,286 B1 | * | 4/2002 | O'Rear ....................... 585/644 |

FOREIGN PATENT DOCUMENTS

| | | | |
|---|---|---|---|
| DE | 3422348 A1 | * 12/1985 | ........... B01J/38/10 |
| GB | 758431 | 10/1956 | |

* cited by examiner

Primary Examiner—Stanley S. Silverman
Assistant Examiner—Jonas N. Strickland
(74) Attorney, Agent, or Firm—Martin C. Fallon

(57) ABSTRACT

Methods of regenerating a coked catalyst by treatment with a hydrogen-containing gas, where the coke is not removed from the catalyst via combustion with an oxygen-containing gas, are disclosed. The hydrogen-containing gas can be hydrogen itself, syngas (a mixture of hydrogen and carbon monoxide), or, if the catalyst is a dehydrogenation catalyst or if a dehydrogenation catalyst is in-line with the coked catalyst, the reaction product of the catalytic dehydrogenation of a $C_{2-5}$ alkane, preferably ethane. The method is an improvement over conventional catalyst regeneration methods which first oxidize the coke to form carbon monoxide and an oxidized form of the catalyst, and then reduce the oxidized form of the catalyst so it can be re-used. The present method removes the coke without requiring an oxidation step.

6 Claims, No Drawings

CATALYST REGENERATION VIA REDUCTION WITH HYDROGEN

FIELD OF THE INVENTION

The present invention relates to the regeneration of coked catalysts, in particular coked molecular redistribution catalysts.

BACKGROUND OF THE INVENTION

Catalytic processes for converting various feedstocks, such as crude oil and natural gas, to commercial products, such as distillate fuels, lubricants and waxes, are important commercial processes. Examples of such processes include catalytic reforming, alkane dehydrogenation, olefin metathesis, isodewaxing, hydrocracking, gas-to liquid conversions, and methanol-to-olefin conversions. Reforming is a complex process that can involve dehydrogenation of naphthenes to aromatics, dehydrocyclization of paraffins, isomerization of paraffins and naphthenes, dealkylation of alkylaromatics, hydrocracking of paraffins to light hydrocarbons, and formation of coke which is deposited on the catalyst.

In most catalytic processes for converting hydrocarbons, the catalysts invariably become deactivated for one or more reasons. When the catalysts are deactivated due to the accumulation of coke deposits, the catalysts must be regenerated to remove the coke deposits and restore the catalyst activity, resulting in downtime.

Coke is normally removed from catalysts by contacting the coke-containing catalysts at high temperature with an oxygen-containing gas to combust and remove the coke. Catalytic activity is then restored by reducing the catalysts at high temperature in a hydrogen atmosphere. The regeneration is either performed in situ or by removing the coked catalyst from the reactor and transporting the coked catalyst to a separate regeneration zone for coke removal.

Coke combustion is typically controlled by recycling the oxygen-containing gas, by adding a small stream of make-up air to replace oxygen consumed in the combustion of coke, and by venting off a small amount of flue gas containing the by-products of coke combustion to allow for the addition of the make-up air. While coke burning progresses from one reactor to the next reactor, the steady addition of make-up gas and the venting of flue gas establishes a steady state condition that produces a nearly constant concentration of water in the circulating regeneration gases.

One problem associated with coke combustion is catalyst deactivation. The combination of temperature, water vapor, and exposure time determines the useful life of the catalyst. Exposing a high surface area catalyst to high temperatures for prolonged periods of time can create amorphous materials with reduced surface areas, which lower the catalyst activity of the catalyst. In contrast to catalyst deactivation by coke deposition, deactivation of this type is permanent, rendering the catalyst unusable. When moisture is present (water is a by-product of coke combustion) the deactivating effects of high temperature exposure are compounded.

Various methods have been proposed in the prior art for reducing the water present during regeneration of catalysts, but these methods require the use of expensive additional drying equipment, such as large beds of desiccant. These beds of desiccant are expensive both to construct and to operate, in part because of the water produced as a by-product of coke combustion.

It would be advantageous to provide methods for reducing the water content during catalyst regeneration in a hydrocarbon conversion unit, and for minimizing the amount of time the catalysts are exposed to temperatures high enough to reduce their surface areas.

SUMMARY OF THE INVENTION

The present invention is directed to a method for regenerating catalysts used in catalytic hydrocarbon conversion processes, which catalysts are deactivated by coke deposits. The coked catalysts are regenerated by reducing the coke present on the catalysts with hydrogen, without first exposing the coke to an oxygen-containing gas at high temperatures. The regeneration methods do not produce water, and minimize the amount of time the catalysts are exposed to relatively high temperatures. Accordingly, the methods reduce the risk of permanent deterioration of surface area of the catalysts. A further advantage is that no additional drying equipment is necessary to remove water, because no additional water is formed during the regeneration process. The methods also maximize the use of existing equipment and minimize the need for additional equipment used solely for catalyst regeneration.

The source of hydrogen for removing the coke deposit can be hydrogen gas, syngas (a mixture of hydrogen and carbon monoxide), or hydrogen produced by the catalytic dehydrogenation of a $C_{2-5}$ alkane stream. It can be advantageous to use syngas when a syngas generator is present on-site. It can be advantageous to use a $C_{2-5}$ alkane stream when such a stream is present on site and a dehydrogenation catalyst is being regenerated, or is present on site and can direct a product stream containing hydrogen and $C_{2-5}$ alkenes to the catalyst being regenerated. In this embodiment, ethane is a preferred alkane for the dehydrogenation, as it is least likely to form coke when exposed to the catalysts at relatively high temperatures.

A preferred embodiment of the catalyst regeneration involves regeneration of dehydrogenation/hydrogenation and/or olefin metathesis catalysts. Such catalysts are present in a number of commercial processes, including catalytic reforming processes and molecular redistribution processes which involve the dehydrogenation of alkanes to form alkenes, metathesis of the resulting alkenes, and rehydrogenation of the metathesized alkenes.

DETAILED DESCRIPTION OF THE INVENTION

The present invention is directed to methods for regenerating catalysts used in catalytic hydrocarbon conversion processes, which catalysts are deactivated by coke deposits. The coked catalysts are regenerated by reducing the coke present on the catalysts with hydrogen, without first exposing the coke to an oxygen-containing gas at high temperatures. The regeneration methods do not produce water, and minimize the amount of time the catalysts are exposed to relatively high temperatures. Accordingly, the methods reduce the risk of permanent deterioration of surface area of the catalysts. A further advantage is that no additional drying equipment is necessary to remove water, because no additional water is formed during the regeneration process. The methods also maximize the use of existing equipment and minimize the need for additional equipment used solely for catalyst regeneration.

Coke

Coke is comprised primarily of carbon, but also includes a relatively small quantity of hydrogen. On an overall basis, hydrogen generally comprises between about 0.5–10 percent of the overall weight of coke. The methods described herein do not involve oxidizing the coke with oxygen-containing gases (although the presence of minor amounts of oxygen may be unavoidable). By minimizing contact with oxygen during catalyst regeneration, water formation is minimized. Although the amount of water generated as a by-product of coke combustion (using oxygen) may be relatively minor, catalyst life can be significantly increased using the methods described herein by minimizing the formation of moisture during catalyst regeneration.

Of course, the amount of water present during regeneration of a hydrocarbon conversion catalyst depends in part on whether the circulating regeneration gases are contacted with an aqueous solution. It is often necessary or desirable to contact the regeneration gases with a basic aqueous solution, for example if the regeneration gases contain an acidic halogen-containing compound. In such a case, the advantage gained by avoiding the formation of water by not using oxygen-containing gases is minimized, since the amount of water from the aqueous solution is generally significantly greater than the amount of water due solely to the combustion of coke.

Hydrocarbon Feeds

Hydrocarbon feeds which can be converted using hydrocarbon conversion catalysts can include paraffins, naphthenes, olefins and mono- and polycyclic aromatics. Preferred feedstocks do not include impurities which poison the catalysts. Sulfurous, nitrogenous and some oxygenated compounds are examples of such impurities. Other impurities to be avoided depend on the nature of the catalyst and the reaction, and are generally known to those of skill in the art.

Catalysts

The catalyst used in hydrocarbon conversion reactions typically includes or more metal components on a refractory support. The metal component typically include one or more metals from Groups IA (1), IIA (2), IVA (4), VIA (6), VIIA (7), VIII (8–10), IIIB (13) or IVB (14) of the Periodic Table. The catalyst also may contain a halogen component, phosphorus component, or sulfur component. The catalysts may be composited with a binder, such as silica, alumina titania or magnesia.

Any number of reactors can be used for the catalytic reactions, such as fixed bed, fluidized bed, ebulated bed, and the like. The catalyst regeneration methods described herein will regenerate coked catalysts in any of these reactors.

Any of these catalysts, when contaminated with coke, can be regenerated using the methods described herein. Preferred catalysts are dehydrogenation/hydrogenation and olefin metathesis catalysts, which, when combined, function as molecular redistribution catalysts. Examples of catalysts which can be regenerated are described below.

Dehydrogenation/Hydrozenation Catalysts

Preferably, the catalyst being regenerated is a catalyst with dehydrogenation/hydrogenation activity. Such catalysts are well known to those of skill in the art, and are described, for example, in U.S. Pat. No. 3,445,541 to Heckelsberg et al., U.S. Pat. No. 3,856,876 to Burnett, U.S. Pat. No. 4,148,833 to Antos, U.S. Pat. No. 4,420,649 to Antos, U.S. Pat. No. 4,476,344 to Kimble, U.S. Pat. No. 4,827,066 to Herber et al., U.S. Pat. No. 4,482,646 to Eastman, U.S. Pat. No. 4,686,316 to Morrison, U.S. Pat. No. 4,7516,342 to Kimble, U.S. Pat. No. 4,777,319 to Kung, U.S. Pat. No. 4,778,942 to Vora et al., U.S. Pat. No. 4,798,911 to Lentz et al., U.S. Pat. No. 4,827,066 to Herber et al., U.S. Pat. No. 4,827,072 to Imai et al., U.S. Pat. No. 4,880,764 to Imai et al., U.S. Pat. No. 4,897,253 to Jenkins, U.S. Pat. No. 4,929,792 to Dessau, U.S. Pat. No. 4,956,517 to Johnson et al., U.S. Pat. No. 4,973,779 to Imal et al., U.S. Pat. No. 4,982,047 to Barri et al., U.S. Pat. No. 5,012,027 to Abrevaya et al., U.S. Pat. No. 5,143,886 to Iezzi et al., U.S. Pat. No. 5,308,822 to Iezzi et al., U.S. Pat. No. 5,321,192 to Cottrell et al., U.S. Pat. No. 5,430,220 to Khare et al., U.S. Pat. No. 5,563,314 to Agaskar et al., U.S. Pat. No. 5,633,421 to Iezzi et al., U.S. Pat. No. 5,905,180 to Yokoyama et al., U.S. Pat. No. 5,972,203 to Smith et al., European Patent Application 0 558 148 A1, and European Patent Application 0 560 437 A1, the contents of each of which are hereby incorporated by reference.

Suitable dehydrogenation catalysts typically include a Group VIII metal from the Periodic Table of the Elements, which includes iron, cobalt, nickel, palladium, platinum, rhodium, ruthenium, osmium and iridium.

Platinum and palladium or the compounds thereof are preferred for use as dehydrogenation catalysts, with platinum and compounds thereof being especially preferred. When referring to a particular metal in this disclosure as being useful, the metal may be present as an elemental metal or as a compound of the metal. Reference to a particular metal is not intended to limit the invention to any particular form of the metal unless the specific name of the compound is given, as in the examples in which specific compounds are named as being used in the preparations.

The process conditions selected for carrying out the dehydrogenation step will depend upon the dehydrogenation catalyst used. In general, the pressure is usually the lowest pressure consistent with the maintenance of catalyst stability. The pressure is typically in the range of between about 0.1 and 10 atm, preferably between about 0.5 and 3 atm. The temperature is typically between about 700° C. to about 1200° F., with temperatures in the range of between 800° F. and 950° F. being particularly preferred. The liquid hourly space velocity (LHSV) is typically between 1 and 40 $hr^{-1}$, preferably between about 25 and 35 $hr^{-1}$.

The above conditions are preferably used when a $C_{2-5}$ alkane stream is dehydrogenated to provide the hydrogen used to regenerate catalysts.

Olefin Metathesis Catalysts

Usually, olefin metathesis catalysts include one or more of a metal or a compound of a metal from Group VIB or Group VIIB of the Periodic Table of the Elements, which include chromium, manganese, molybdenum, rhenium and tungsten. When used in this disclosure, the Periodic Table of the Elements referred to is the version published by the Chemical Abstracts Service in the Handbook of Chemistry and Physics, 72nd Edition 1991–1992).

Molybdenum, rhenium, tungsten, and compounds including these metals are preferred for use in olefin metathesis and molecular redistribution chemistry. Tungsten and compounds including tungsten are particularly preferred. The metals described above may be present as elemental metals or as compounds including the metals, such as, for example, metal oxides. The metals may be present on the catalyst component either alone or in combination with other metals.

In most cases, the metals in the catalyst mass will be supported on a refractory material. Refractory materials suitable for use as a support for the metals include conventional refractory materials used in the manufacture of catalysts for use in the refining industry. Such materials include, but are not necessarily limited to, alumina, zirconia, silica, boria, magnesia, titania and other refractory oxide material or mixtures of two or more of any of the materials. The support may be a naturally occurring material such as clay, or synthetic materials such as silica-alumina and borosilicates. Molecular sieves such as zeolites also have been used as supports for the metals used in carrying out the dual functions of the catalyst mass. See, for example, U.S. Pat. 3,668,268. Mesoporous materials such as MCM-41 and MCM-48, such as described in Kresge, C. T., et al., *Nature*, 359:710–712 (1992), may also be used as a refractory support. Other known refractory supports such as carbon may also serve as a support for the active form of the metals in certain embodiments. The support is preferably non-acidic, i.e., having few or no free acid sites on the molecule. Free acid sites on the support may be neutralized by means of alkali metal salts, such as those of lithium. Alumina, particularly alumina on which the acid sites have been neutralized by an alkali salt such as lithium nitrate, is usually preferred as a support for the hydrogenation/dehydrogenation component, and silica is usually preferred as the support for the metathesis component.

A typical catalyst for use molecular redistribution as described herein includes a platinum component and a tungsten component as described in U.S. Pat. No. 3,856,876, the entire disclosure of which is herein incorporated by reference. In one embodiment, the catalyst includes a mixture of platinum-on-alumina and tungsten-on-silica, wherein the volumetric ratio of the platinum component to the tungsten component is greater than 1:50 and less than 50:1. Preferably the volumetric ratio of the platinum component to the tungsten component in this particular embodiment is between 1:10 and 10:1. The percent of surface of the metals should be maximized with at least 10% of the surface metal atoms exposed to the reactant.

In one embodiment, both the hydrogenation/dehydrogenation component and the olefin metathesis component are present within the catalyst mass on the same support particle as, for example, a catalyst in which the hydrogenation/dehydrogenation component is dispersed on an unsupported olefin metathesis component such as tungsten oxide. However, in an alternative embodiment, the catalyst components are separated on different particles.

Olefin metathesis catalysts, in particular those described above, alone or in combination with hydrogenation/dehydrogenation catalysts, can be regenerated using the methods described herein.

Methanol Synthesis Catalysts

Any catalyst used to convert syngas to methanol can be regenerated using the methods described herein. Examples of suitable catalysts for converting syngas to methanol are described, for example, in Pichler, H and Ziesecke, K. H., "The Isosynthesis", U.S. Bureau of Mines Bulletin 488 (1950) and French Patent No. 2037567. U.S. Pat. No. 2,061,470 discloses using the reduction product of a fused mixture of copper oxide and manganese oxide, or copper oxide and zinc oxide, and an oxide of an element selected from the group consisting of chromium, vanadium, zirconium, aluminum, magnesium, titanium, thorium, silicon and cerium as a methanol synthesis catalyst. U.S. Pat. No. 4,298,354 discloses using an oxide-complex catalyst containing copper, thorium, an alkali metal and at least one other metal selected from the group consisting of Ca, Mo, Rh, Mn, Pt, Ce, Cr, Zn, Al, Ti, La, V, U, Ru, Re and Pd. U.S. Pat. No. 4,377,643 discloses using a catalytic complex containing ruthenium, copper, an alkali metal and a promoter selected from the group consisting of Rh, Ir, Pd and Pt). All of these catalysts can be regenerated using the methods described herein. The contents of each of these patents is hereby incorporated by reference.

Methanol Conversion Catalysts

Any catalyst which converts methanol (or other products produced using the methanol synthesis catalysts described above) to higher molecular weight products can be regenerated using the methods described herein. Typically, ELAPOs, preferably SAPOs, are used to convert methanol to low molecular weight olefins such as ethylene, relatively acidic zeolites are used to convert methanol to aromatics, and borosilicates and relatively non-acidic zeolites (typically at relatively high pressures) are used to convert methanol to iso-paraffins.

Catalysts and reaction conditions for oligomerizing olefins are well known to those of skill in the art. Such catalysts and conditions are described, for example, in U.S. Pat. Nos. 6,013,851; 6,002,060; 5,942,642; 5,929,297; 4,608,450; 4,551,438; 4,542,251; 4,538,012; 4,511,746; 4,465,788; 4,423,269; 4,423,268; 4,417,088; 4,414,423; 4,417,086; and 4,417,087, the contents of which are hereby incorporated by reference.

ELAPOs (Including SAPOs)

Various molecular sieves, particularly silicoaluminophosphates (SAPOs), are known to promote the conversion of oxygenates such as methanol to olefins such as ethylene. The reactions tend to provide mixtures of olefins that are predominantly ethylene and propylene.

Preferred catalysts have relatively small pores, for example less than about 5 Angstroms, as determined by measurements described in D. W. Breck, ZEOLITE MOLECULAR SIEVES by John Wiley & Sons, New York (1974), hereby incorporated by reference in its entirety.

Catalysts useful for this conversion, and which can be regenerated using the methods described herein, are described, for example, in U.S. Pat. Nos. 3,928,483, 4,025, 575, 4,252,479 (Chang et al.); U.S. Pat. No. 4,496,786 (Santilli et al.); U.S. Pat. No. 4,547,616 (Avidan et al.); U.S. Pat. No. 4,677,243 (Kaiser); U.S. Pat. No. 4,843,183 (Inui); U.S. Pat. No. 4,499,314 (Seddon et al.); U.S. Pat. No. 4,447,669 (Harmon et al.); U.S. Pat. No. 5,095,163 (Barger); U.S. Pat. No. 5,191,141 (Barger); U.S. Pat. No. 5,126,308 (Barger); U.S. Pat. No. 4,973,792 (Lewis); and U.S. Pat. No. 4,861,938 (Lewis), the contents of each of which are hereby incorporated by reference. Additional catalysts and conditions are also described in PCT WO 98/57743, the contents of which are hereby incorporated by reference.

Non-zeolitic molecular sieves include molecular sieves which have the proper effective pore size and are embraced by an empirical chemical composition, on an anhydrous basis, expressed by the empirical formula:

$$(EL_xAl_yP_z)O_2$$

Where EL is an element selected from the group consisting of silicon, magnesium, zinc, iron, cobalt, nickel, manganese, chromium and mixtures thereof, x is the mole fraction of EL and is at least 0.005, y is the mole fraction of Al and is at least 0.01, z is the mole fraction of P and is at least 0.01 and x+y+z=1. When EL is a mixture of elements, x represents the total amount of the metal mixture present. Preferred elements (EL) are silicon, magnesium and cobalt with silicon being especially preferred. Numerous ELAPOs are known in the art, and are described, for example, in U.S. Pat. No. 5,191,141 (ELAPO); U.S. Pat. No. 4,554,143 (FeAPO); U.S. Pat. No. 4,440,871 (SAPO); U.S. Pat. No. 4,853,197 (MAPO, MnAPO, ZnAPO, CoAPO); U.S. Pat. No. 4,793,984 (CAPO), U.S. Pat. Nos. 4,752,651 and 4,310, 440, the contents of each of which are hereby incorporated by reference.

Generally, the ELAPO molecular sieves are synthesized by hydrothermal crystallization from a reaction mixture containing reactive sources of EL, aluminum, phosphorus and a templating agent. Reactive sources of EL are the metal salts such as the chloride and nitrate salts. When EL is silicon, a preferred source is fumed, colloidal or precipitated silica. Preferred reactive sources of aluminum and phosphorus are pseudo-boehmite alumina and phosphoric acid. Preferred templating agents are amines and quaternary ammonium compounds.

Especially preferred ELAPOs are those in which EL is silicon (usually referred to as SAPOs). Examples of SAPOs include those described in U.S. Pat. Nos. 4,440,871, 5,126,308, and 5,191,141.

Zeolites

Catalysts which can be regenerated using the methods described herein also include zeolites and/or non-zeolitic molecular sieves.

The zeolites and/or molecular sieves can be small, intermediate and/or large pore size zeolites. Examples of these catalysts are described, for example, in U.S. Pat. Nos. 3,546,102; 3,574,092; 3,679,575; 4,018,711; 4,104,320; 4,347,394; 4,370,224; 4,417,083; 4,434,311; 4,447,316 and 5,559,068. Zeolite-containing catalysts, for example the zeolite mordenite, ZSM-type zeolites, zeolite L, Faujasites X and Y, and the zeolite omega, can also be regenerated. L-zeolites and zeolites having an L-zeolite-type channel structure and size, such as ECR-2, which is described in U.S. Pat. No. 4,552,731, and ECR-31, which is described in U.S. Pat. No. 5,624,657 (Vaughan) can also be regenerated.

The composition of type L-zeolite expressed in terms of mole ratios of oxides, may be represented by the following formula:

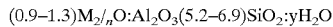

$$(0.9-1.3)M_{2/n}O:Al_2O_3(5.2-6.9)SiO_2:yH_2O$$

In the above, formula M represents a cation, n represents the valence of M, and y may be any value from 0 to about 9. Zeolite L, its X-ray diffraction pattern, its properties, and method for its preparation are described in detail in, for example, U.S. Pat. No. 3,216,789, the contents of which is hereby incorporated by reference. The actual formula may vary without changing the crystalline structure. For example, the mole ratio of silicon to aluminum (Si/Al) may vary from 1.0 to 3.5.

Examples of useful large pore zeolites include ZSM-3, ZSM-4, ZSM-10, ZSM-12, ZSM-20, zeolite beta, zeolite omega, zeolite L, zeolite X, zeolite Y, REY, USY, RE-USY, mordenite, LZ-210, LZ-210-M, LZ-210-T, LZ-210-A, SSZ-24, SSZ-26, SSZ-31, SSZ-33, SSZ-35, SSZ-37, SSZ-41, SSZ-42, SSZ-44 and MCM-58. ZSM-3 is described in U.S. Pat. No. 3,415,736. ZSM-4 is described in UK Application No. 1,117,568. ZSM-10 is described in U.S. Pat. No. 3,692,470. ZSM-12 is described in U.S. Pat. No. 3,832,449. ZSM-20 is described in U.S. Pat. No. 3,972,983. Zeolite beta is described in U.S. Pat. No. Re. 28,341 (of original U.S. Pat. No. 3,308,069). Zeolite omega is described in U.S. Pat. No. 4,241,036. Zeolite L is described in U.S. Pat. No. 3,216,789. Zeolite X is described in U.S. Pat. No. 2,882,244. Zeolite Y is described in U.S. Pat. No. 3,130,007. LZ-210, LZ-210M, LZ-210-T, LZ-210-A and mixtures thereof are described in U.S. Pat. No. 4,534,853. SSZ-24 is described in U.S. Pat. No. 4,834,977. SSZ-26 is described in U.S. Pat. No. 4,910,006. SSZ-31 is described in U.S. Pat. No. 5,106,801. SSZ-33 is described in U.S. Pat. No. 4,963,337. SSZ-35 is described in U.S. Pat. No. 5,316,753. SSZ-37 is described in U.S. Pat. No. 5,254,514. SSZ-41 is described in U.S. Pat. No. 5,591,421. SSZ-42 is described in U.S. Ser. No. 08/199,040. SSZ-44 is described in U.S. Pat. No. 5,580,540. MCM-58 is described in U.S. Pat. No. 5,437,855.

Examples of useful intermediate pore size zeolites include ZSM-5, ZSM-11, ZSM-22, ZSM-23, ZSM-35; ZSM-48, ZSM-57, SUZ-4, SSZ-23; SSZ-25; SSZ-28, SSZ-32, and SSZ-36. ZSM-5 is described in U.S. Pat. No. Re. 29,948 (of original U.S. Pat. No. 3,702,886). ZSM-11 is described in U.S. Pat. No. 3,709,979. ZSM-22 is described in U.S. Pat. No. 4,556,477. ZSM-23 is described in U.S. Pat. No. 4,076,842. ZSM-35 is described in U.S. Pat. No. 4,016,245. ZSM-48 is described in U.S. Pat. No. 4,585,747. SUZ-4 is described in EP Application No. 353,915. SSZ-23 is described in U.S. Pat. No. 4,859,422. SSZ-25 is described in U.S. Pat. Nos. 4,827,667 and 5,202,014. SSZ-28 is described in U.S. Pat. No. 5,200,377. SSZ-32 is described in U.S. Pat. No. 5,053,373. The entire contents of all these patents and patent applications are incorporated herein by reference.

Non-acidic zeolites, for example the L-zeolites described in U.S. Pat. Nos. 3,216,789 (Breck), 4,552,731 (Vaughan), 4,544,539 (Wortel), 5,491,119 (Verduijn), and 4,530,824 (assigned to Tosoh Ltd.), can also be regenerated using the methods described herein.

The entire contents of all the above-cited patents are incorporated herein by reference.

Borosilicates

The term "silicate" refers to a zeolite having a high mole ratio of silicon oxide relative to aluminum oxide, preferably a mole ratio greater than 100. As used herein, the term "aluminosilicate" refers to a zeolite containing both alumina and silica and the term "borosilicate" refers to a zeolite containing oxides of both boron and silicon. Borosilicates may also contain other components that can contribute a weaker form of acidity than alumina, for example gallium, iron, indium, titanium and vanadium.

Crystalline borosilicates preferably have the following compositions in terms of mole ratios of oxides:

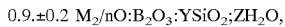

$$0.9\pm0.2\ M_2/nO:B_2O_3:YSiO_2:ZH_2O,$$

Where M is at least one cation having a valence of n, Y is between 4 and about 600, and Z is between 0 and about 160.

Examples of borosilicates which can be regenerated using the methods described herein include those described in U.S. Pat. No. 4,268,420, U.S. Pat. No. 4,269,813, U.S. Pat. No. 4,292,457, and U.S. Pat. No. 4,292,458, the contents of which are incorporated herein by reference. Specific examples include AMS borosilicate molecular sieves, Amoco Borosilicate (AMS-1B) ZSM-5, as described in U.S. Pat. No. 4,269,813; Niobium-borosilicate ZSM-5 as described in EP 0 089 574; Borosilicate (ZBH) Pentasil as described in EP 0 077 946; borosilicate ZSM-5 as described in EP 0 046 504; Titanoborosilicate (ZMQ-TB) ZSM-5 as described in EP 0 104 107; Ironborosilicate ZSM-5 as described in EP 0 148 038, Hoechst Boro-aluminosilicate as described in EP 0 073 482, Idemitsu Borosilicate as described in Japan 07 817, National Distillers Borosilicates (USI-10B) as described in U.S. Pat. No. 4,423,020, Snamprogetti Borosilicate (Boralite A) as described in Nu-1 Italy 22 638, and Boralites B, C, D and E ZSM-5 as described in Italian Patent No. 22 638 and German Patent No. 3 316 488.

Sources of Hydrogen

One source of hydrogen which can be used is hydrogen itself. However, this generally requires the presence of a hydrogen generator on site, which can be relatively expensive. The hydrogen can alternatively be derived from other sources, particularly if these other sources are found on site. For example, if syngas is being generated on site, syngas can be used to regenerate the catalyst. Those of skill in the art can readily produce syngas from methane and/or ethane using conventional technology. The temperature used in the catalyst regeneration may need to be varied depending on the type of catalyst, such that the carbon monoxide in the syngas does not form a significant amount of undesired products.

When dehydrogenation catalysts are present, either as partially coked catalysts or at another place in the plant, a stream containing $C_{2-5}$ alkanes, for example from natural gas well effluent, can be dehydrogenated in situ to produce alkenes and hydrogen, and the hydrogen can be used to regenerate the catalyst by removing the coke. Advantageously, the alkenes such as ethylene can be isolated from the effluent.

Method Steps

Before the catalyst regeneration occurs, the catalyst is used in the conversion of hydrocarbons and becomes coked. The conversion may involve virtually any type of reaction, such as catalytic reforming, isodewaxing, hydrocracking, oligomerization, isomerization, dehydrogenation, and the like. The hydrocarbon processing deactivates the catalyst with carbon (coking), and may also contaminate heaters and heat exchangers. Following catalyst deactivation, the methods described herein are used to regenerate the catalysts. The methods involve stopping the flow of feed gas to the reactor and adjusting the temperature of the reactor to a suitable temperature, preferably in the range of between 200 and 1000° C., at a pressure around ambient, but which can range as high as about 5000 psig. The catalyst bed is purged with hydrogen at a feed rate of between 1 cc/min per gram of catalyst and 1000 cc/min per gram of catalyst for between 1 hour and 5 days, until suitable catalyst activity has been restored. One method for determining whether catalytic activity has been restored is to perform the desired reaction using the restored catalyst.

The duration of the reduction step should be only as long as necessary to remove the coke from the catalysts, and is preferably performed in-situ, although it will also work if the catalyst is removed from the reactor. Following catalyst regeneration, the hydrogen can be replaced with nitrogen or another inert gas, the temperature and pressure adjusted to that required to carry out the desired conversion with the regenerated catalyst, and then the nitrogen flow stopped and replaced with feed gas. Alternatively, the hydrogen can be replaced directly with feed gas.

The present invention will be better understood with reference to the following nonlimiting example.

Example 1

Regeneration of Molecular Redistribution/ Molecular Averaging Catalysts Via Hydrogen Treatment The following example compares the regeneration of a bifunctional catalyst system containing a dehydrogenation/ rehydrogenation catalyst and an olefin metathesis catalyst, using conventional oxygen regeneration and using the hydrogen reduction method disclosed herein.

The catalysts included a mixture of Pt/alumina and W/silica. The catalysts were used in a molecular redistribution/molecular averaging reaction until they were coked, at which time they were regenerated using both methods.

The oxygen regeneration was performed as follows:
a) terminating the molecular redistribution/averaging reaction by stopping the feed at the reaction temperature (e.g., about 800° F.) and pressure (e.g., about 2000 psig);

b) dropping the temperature to about 400° F. and the pressure to ambient pressure while purging with 200 cc/min nitrogen;

c) purging with nitrogen at a flow rate of 200 cc/min and a temperature of 400° F. for about two hours;

d) heating from about 400° F. to about 700° F. within two hours and holding the temperature at about 700° F. for about eight hours while purging in 200 cc/min diluted air (1% oxygen in nitrogen v/v); and e) heating from about 700° F. to about 900° F. within one hour and holding at about 900° F. for about four hours while purging in 200 cc/min diluted air (1% oxygen in nitrogen v/v);

f) at about 900° F., switching from 200 cc/min diluted air to 200 cc/min nitrogen, and holding at about 900° F. for about five hours;

g) at about 900° F., switching from 200 cc/min nitrogen to 200 cc/min hydrogen, for reduction and holding at about 900° F. for about five hours;

h) cooling the reactor from about 900° F. to a suitable reaction temperature (about 800° F.) in 200 cc/min hydrogen within about three hours;

i) switching from 200 cc/min hydrogen to 200 cc/min nitrogen and purging the catalyst for about two hours;

j) pressurizing the reactor to a suitable reaction temperature (about 2000 psig); and k) starting the reaction with the re-generated catalyst by starting the feed and stopping the nitrogen flow.

The hydrogen regeneration was performed as follows:
a) terminating the molecular redistribution/averaging reaction by stopping the feed at the reaction temperature (e.g., about 800° F.) and pressure (e.g., about 2000 psig);

b) dropping the pressure to ambient pressure and purging with 200 cc/min hydrogen;

c) purging with hydrogen at a flow rate of 200 cc/min and a temperature of 800° F. for about three hours;

d) heating from about 800° F. to about 900° F. within two hours and holding the temperature at about 900° F. for about eight hours while purging in 200 cc/min hydrogen; and e) cooling the reactor from about 900° F. to a suitable reaction temperature (about 800° F.) in 200 cc/min hydrogen within about one hour;

f) switching from 200 cc/min hydrogen to 200 cc/min nitrogen and purging the catalyst for about two hours;

j) pressurizing the reactor to a suitable reaction temperature (about 2000 psig); and k) starting the reaction with the re-generated catalyst by starting the feed and stopping the nitrogen flow.

The ability of the regenerated catalysts to function was directly compared, and the two were virtually indistinguishable. However, the regeneration method using hydrogen took significantly fewer steps and considerably less time.

I claim:

1. A method of regenerating a coked molecular redistribution catalyst comprising contacting the catalyst with a hydrogen-containing gas to produce a regenerated catalyst, wherein the coke is not first removed via combustion with an oxygen-containing gas, and the catalytic activity of said regenerated catalyst is effectively the same as if said coke had first been removed via combustion with an oxygen-containing gas.

2. The method of claim 1, wherein the hydrogen-containing gas is syngas.

3. The method of claim 1, wherein the hydrogen-containing gas is obtained by dehydrogenation of a $C_{2-5}$ alkane.

4. The method of claim 3 wherein the alkane is ethane.

5. The method of claim 1 wherein the molecular redistribution catalyst comprises a dehydrogenation/hydrogenation catalyst and an olefin metathesis catalyst in which, said dehydrogenation/hydrogenation catalyst comprises a Group VIII metal selected from the group consisting of iron, cobalt, nickel, palladium, platinum, rhodium, ruthenium, osmium, iridium and mixtures and combinations thereof; and said olefin metathesis catalyst comprises a Group VIB or VIIB metal selected from the group consisting of chromium, manganese, molybdenum, rhenium, tungsten and mixtures and combinations thereof.

6. The method of claim 1 wherein said contacting step is carried out at a temperature in the range of about 200 to about 1000° C.; and at a pressure in the range of about 0 to about 5000 psig.

* * * * *

UNITED STATES PATENT AND TRADEMARK OFFICE
CERTIFICATE OF CORRECTION

PATENT NO. : 6,632,765 B1
DATED : October 14, 2003
INVENTOR(S) : Chen

It is certified that error appears in the above-identified patent and that said Letters Patent is hereby corrected as shown below:

<u>Title page,</u>
Item [75], Inventors, change "Con-Yan Chen" to -- Cong-Yan Chen --.

Signed and Sealed this

Seventh Day of September, 2004

JON W. DUDAS
*Director of the United States Patent and Trademark Office*